UNITED STATES PATENT OFFICE.

OTTOKAR HENRY NOWAK, OF CHICAGO, ILLINOIS, ASSIGNOR OF ONE-HALF TO EUGENE SMITH, OF CHICAGO, ILLINOIS.

WATERPROOF COMPOUND.

No. 809,731.      Specification of Letters Patent.      Patented Jan. 9, 1906.

Application filed April 14, 1905. Serial No. 255,661.

*To all whom it may concern:*

Be it known that I, OTTOKAR HENRY NOWAK, a subject of the Emperor of Austria-Hungary, residing at Chicago, county of Cook, State of Illinois, have invented a certain new and useful Improvement in Waterproof Compounds; and I declare the following to be a full, clear, and exact description of the invention, such as will enable others skilled in the art to which it pertains to make and use the same.

My invention relates in general to waterproofing compounds, and more particularly to compositions especially adapted for fibrous materials of all kinds—such, for instance, as paper.

It is well known that a mixture of a chemical solution of formaldehyde with a casein solution and suitable coloring ingredients when applied to paper—such as wall-paper, chromolithograph or other coated paper—and dried forms a waterproof or insoluble coating. It is customary in manufacturing various forms of paper to add pigment or other coloring-matter to a composition of formaldehyde and casein and apply the same to the paper in order to impart thereto a waterproof coating of any desired appearance. An objection to the use of such a composition is due to the tendency of formaldehyde to coagulate all kinds of albumen, animal and vegetable glues, and casein when there is an excess thereof even when the solution is weak. The result is that the compound often coagulates before being applied when there is an excess of formaldehyde and coagulates under any circumstances after standing from ten to twenty-four hours even if only the slightest amount of very weak formaldehyde solution is used in the proper proportion. It is therefore necessary to use this composition within ten hours after preparing the same, as the casein or albumen liquids very quickly oxidize when exposed to the air, resulting in coagulation and rendering the composition useless. Another objection to the use of such composition is that the formaldehyde frequently changes the color of delicate shades of pigments which are sometimes employed to give to the composition a desired color.

The primary object of my invention is to provide a composition for waterproofing and, if desired, also coloring fiber materials, such as paper, wood, leather, and also rubber and metals which will not coagulate if the exact proportions of the ingredients are not employed and will also continue in condition for use indefinitely after being prepared.

A further object of my invention is to provide a composition for simultaneously waterproofing and coloring paper and other materials capable of permanently imparting the most delicate shades thereto.

A further object of my invention is to provide a composition for the purpose described which will be simple in preparation, inexpensive in compounding, and efficient in use.

The embodiment of my invention herein disclosed may be generally described as a composition of dioxynaphthylmethane preparation soluble in water with casein or its equivalents—such as albumen, animal or vegetable glues, &c.—and also, if desired, a coloring ingredient.

I have discovered that in preparing waterproofing compounds of all kinds for fibrous materials—such as paper, wall-paper, chromolithograph or other coated paper, or wood—also in preparing waterproof sizing of all kinds for use on silk, wool, cotton, felt, and straw dioxynaphthylmethane preparation soluble in water either in solution with water or even in its original state of any strength may be mixed with liquid casein, glues in general, gelatin, egg or blood albumen, or any kind of animal or vegetable albumen, and a composition results which will never coagulate and which will remain in condition for use for any length of time. This composition after being applied to any of the fibrous materials such as those mentioned and dried will give a waterproof coating, sizing, or paint.

A further advantage derived from the use of my improved composition in any of the various forms mentioned for coating or sizing and for paints is that even if the most sensitive mineral or vegetable or other pigment colors are used the colors will continue without changing or becoming discolored, whereas when formaldehyde is used on account of some acid reaction the discoloration of sensitive colors occurs.

The waterproof or water-resisting action of all of the above-mentioned coating compounds, sizings, or paints is far better than when formaldehyde solution is used in similar compositions.

Although I do not wish to limit myself to any particular proportions to be used in forming my composition, I prefer to use a five-per-cent. solution—that is, a mixture of five pounds of the soapy dioxynaphthylmethane preparation with ninety-five pounds of water with a solution of one pound of soluble casein (alkali casein) dissolved in seven or eight pounds of water. In lieu of the solution of casein there may be used a solution of one pound of glue, gelatin, or albumen of any kind dissolved in three or four pounds of water. A composition having ingredients of substantially the proportions mentioned forms a waterproof and water-resisting coating, sizing, or paint in liquid form which will continue in condition for use for any length of time without changing. I have further discovered that all vegetable, animal, or natural gums, starch, gum-tragantum, Irish moss in liquid solution can be kept even open and exposed to the air in perfect condition without changing or deteriorating for a great length of time and that five or ten per cent. of a solution of two pounds of dioxynaphthylmethane preparation and ninety-eight pounds of water forms a composition sufficient to act as an insecticide or germ-destroyer of great merit. I have further discovered that a composition containing dioxynaphthylmethane preparation of its full strength may be used on leather, rubber, and metals of any kind, and therefore the use of paints in connection with the above albuminoids and dioxynaphthylmethane preparation for all and every kind of material is possible without corroding or oxidizing.

While I have herein described my compound as made up of a composition of an albuminoid with dioxynaphthylmethane preparation soluble in water and while the latter ingredient may be made in any manner known in the art, yet I prefer to make the latter as set out in the patent to Bachman, No. 759,208, dated May 3, 1904, which consists in heating a mixture of liquid potash soaps and naphthol dissolved in formalin.

From the foregoing description it will be observed that I have invented an improved composition for coating various materials with a waterproof coating and simultaneously imparting thereto any desired color, consisting in a composition of dioxynaphthylmethane preparation soluble in water and any of the various albuminoids.

Having now fully described my invention, what I claim as new, and desire to secure by Letters Patent, is—

1. A compound for the purpose described comprising a preparation of dioxynaphthylmethane soluble in water and an albuminoid.

2. A compound for the purpose described comprising a preparation of dioxynaphthylmethane soluble in water and casein.

3. A compound for the purpose described comprising a preparation of dioxynaphthylmethane soluble in water, an albuminoid and a coloring ingredient.

4. A compound for the purpose described comprising a preparation of dioxynaphthylmethane soluble in water, and an adhesive.

5. A compound for the purpose described comprising a preparation of dioxynaphthylmethane soluble in water, an albuminoid, and a solvent.

6. A compound for the purpose described comprising a preparation of dioxynaphthylmethane soluble in water, casein and a solvent.

7. A compound for the purpose described comprising a preparation of dioxynaphthylmethane soluble in water, an albuminoid and water.

8. A compound for the purpose described comprising a preparation of dioxynaphthylmethane soluble in water, casein, and water.

In testimony whereof I sign this specification in the presence of two witnesses.

O. HENRY NOWAK.

Witnesses:
GEO. L. WILKINSON,
C. A. MULLEN.